(12) United States Patent
Falesiedi

(10) Patent No.: US 8,915,316 B2
(45) Date of Patent: Dec. 23, 2014

(54) VEHICLE TRACTION MODULE AND RESPECTIVE TERRESTRIAL VEHICLE

(76) Inventor: Osvaldo Falesiedi, Canavese (IT)

( * ) Notice: Subject to any disclaimer, the term of this patent is extended or adjusted under 35 U.S.C. 154(b) by 80 days.

(21) Appl. No.: 13/261,364

(22) PCT Filed: Jan. 13, 2011

(86) PCT No.: PCT/IB2011/050149
§ 371 (c)(1),
(2), (4) Date: Jul. 13, 2012

(87) PCT Pub. No.: WO2011/086515
PCT Pub. Date: Jul. 21, 2011

(65) Prior Publication Data
US 2012/0312616 A1  Dec. 13, 2012

(30) Foreign Application Priority Data
Jan. 14, 2010  (EP) .................................. 10425007

(51) Int. Cl.
*B62D 57/02* (2006.01)
*B62D 57/00* (2006.01)
*B62D 57/024* (2006.01)

(52) U.S. Cl.
CPC ............... *B62D 57/00* (2013.01); *B62D 57/02* (2013.01); *B62D 57/024* (2013.01)
USPC ........................................................ 180/7.1

(58) Field of Classification Search
USPC .................. 180/9.48, 9.52, 7.1, 7.2; 280/638
See application file for complete search history.

(56) References Cited

U.S. PATENT DOCUMENTS

| | | | |
|---|---|---|---|
| 6,145,610 A * | 11/2000 | Gallignani | 180/9.48 |
| 6,431,079 B1 | 8/2002 | Appleton et al. | |
| 6,827,176 B2 * | 12/2004 | Bean et al. | 180/411 |
| 8,322,469 B2 * | 12/2012 | Yoon et al. | 180/7.1 |
| 8,496,077 B2 * | 7/2013 | Nesnas et al. | 180/7.5 |
| 2009/0229894 A1 * | 9/2009 | Roucka | 180/9.48 |

FOREIGN PATENT DOCUMENTS

| | | |
|---|---|---|
| DE | 21 01 375 | 8/1972 |
| DE | 295 02 611 | 6/1995 |
| EP | 2 058 154 | 5/2009 |

* cited by examiner

*Primary Examiner* — Tony Winner
(74) *Attorney, Agent, or Firm* — Stetina Brunda Garred & Brucker

(57) ABSTRACT

Vehicle traction module (1) comprising—a pair of runners ((11,12), (21,22), (42, 43)), side by side according to a first direction (X)—first moving means ((14, 17, 19), (24, 31, 28), (45,48,49)) suitable to generate an alternate and reciprocal approaching and departing of the runners along the first direction (X),—the pair of runners ((11,12), (21,22), (42, 43)), having a cylindrical symmetry shape wherein the respective axis of symmetry lie along the first direction (X),—second moving means ((15, 16, 18, 17), (30,26 31, 27), (40, 41) suitable to generate a rotation of the runners along the first direction (X).

17 Claims, 4 Drawing Sheets

VEHICLE TRACTION MODULE AND RESPECTIVE TERRESTRIAL VEHICLE

FIELD OF THE INVENTION

The present invention refers to a vehicle traction module and respective terrestrial vehicle.

DESCRIPTION OF THE PRIOR ART

According to the prior art there are two main traction systems for terrestrial vehicles or, anyway, for vehicles suitable to move in gravitational systems: on wheels made of rubber, or of iron, etc.

Although the tracked traction systems are the most suitable on particularly soft grounds, they are not suitable on delicate surfaces, above all when it is necessary to protect the ground, such as for example in archaeological excavations.

Traction systems based on a different friction coefficient of the bearing parts, with respect to the ground are also known in the art.

For example DE2101375 or DE2405343 or EP043161 show a bearing runner having a plurality of elongated elements or nails in the lower part, inclined in order to determine two different friction coefficients with the ground according to two opposite directions, respectively. Thus, the oscillation of an inertial mass or the alternate approaching and departing of two runners allows a forward movement in the direction having the lower friction coefficient with the ground.

Such traction system is particularly efficient in case of steep slopes, but the motion's speed is very limited. Traction systems based on rolling are more suitable to reach high speeds, but are not suitable for steep slopes.

SUMMARY OF THE INVENTION

The aim of the present invention is to provide a vehicle traction system suitable to solve the aforementioned problem and to overcome remarkable slopes, reaching a speed comparable with the on-wheel traction systems.

The object of the present invention is a vehicle traction module, in accordance with claim 1.

Advantageously, the forward movement of the device may vary with respect to specific ground conditions and to the slope.

A further aim of the invention is to provide a vehicle based on the present traction module, able to move fast, where possible, and to overcome steep slopes.

The object of the present invention is also a terrestrial vehicle, in accordance with claims 11 and 12.

Another aim of the present invention is to provide control methods of the present terrestrial vehicles, able to easily overcome obstacles or adverse ground conditions.

The object of the present invention is also a control method of a terrestrial vehicle, in accordance with claim 13.

The dependent claims describe the preferred embodiments of the invention, and are an integral part of this description.

BRIEF DESCRIPTION OF THE FIGURES

Further characteristics and advantages of the invention will be more apparent in light of a detailed description of preferred, but non-exclusive, embodiments of a traction module and its corresponding terrestrial vehicle, shown with the help of the drawings that are attached hereto, which are merely illustrative and not limitative, in which.

In the figures the same reference numbers and letters identify the same elements or components.

DETAILED DESCRIPTION OF A PREFERRED EMBODIMENT OF THE INVENTION

A traction module 1 according to the present invention, with particular reference to the figures, comprises a pair of runners 11 and 12, each one of them having a cylindrical symmetry shape, rotatably associated between each other with respect to a common axis or direction of rotation X and a medial fulcrum 13. The fulcrum comprises a rotating rod according to an axis Y perpendicular to the axis X. Moreover, the module comprises first moving means suitable to generate a rotation, possibly independently, of said runners around the axis X and second moving means suitable to generate a synchronous and reciprocal approaching and departing of the runners along the axis X.

Figure 1:
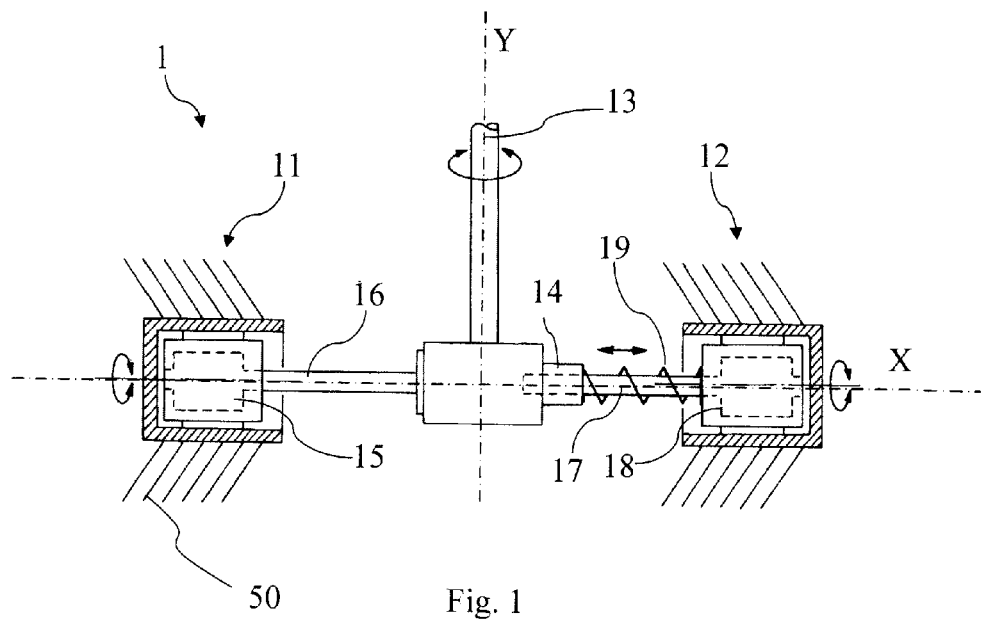
FIG. 1 schematically shows the first alternative embodiment of the traction module.

According to a first alternative embodiment shown in FIG. 1, the moving means are realized by a pair of electric motors 15, 18, the stator of each one of them being integrated in the runners 11 or 12, so that the rotors 16 and 17 are opposed towards the fulcrum 13. At least a free end of one of the rotors is connected to the fulcrum 13 by means of at least a linear actuator 14 suitable to move near and away the respective runner 12 from the fulcrum 13, determining the aforementioned reciprocal approaching and departing of the runners 11 and 12. Possibly a linear actuator is present for each runner.

The fulcrum has the function to allow the rotation of the traction module around the axis Y. It may be realized by a rod which may indifferently be enbloc with module 1 and rotatably associated to a vehicle to which the traction module is associated, or it may be rotatably associated to the traction module 1.

Possibly, the linear actuator 14 is configured only for attracting or repelling the rotor 17, being slidingly associated to it along X, cooperating with a respective counter spring 19.

Other means and structures for realizing said approaching and departing are described in the documents known in the art.

Figure 2:
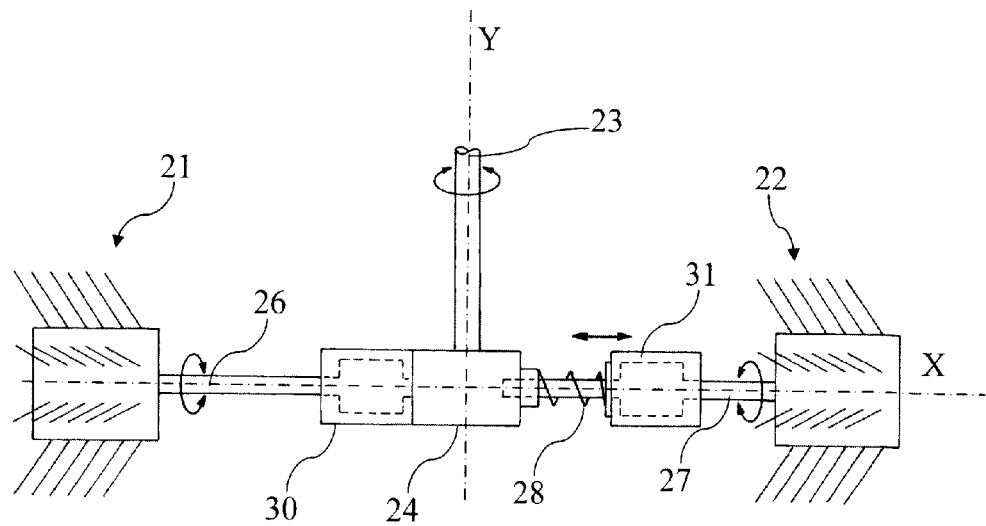
FIG. 2 schematically shows a second alternative embodiment of the traction module.

According to a second alternative embodiment of the traction module, shown in FIG. 2, the stators of the motors 30 and 31 are connected back to back to the rod 23 by at least a linear actuator 24, directly connected to the rod 23 and suitable to determine the approaching and departing of at least one of the stators of motors 30 and 31. The rotors 26 and 27 of the motors are placed along X, namely in an extrovert or divergent position with respect to the rod 23, and connected to the runners 21 and 22. The linear actuator 24 may cooperate, as said above, with a counter spring 28.

Figure 3:
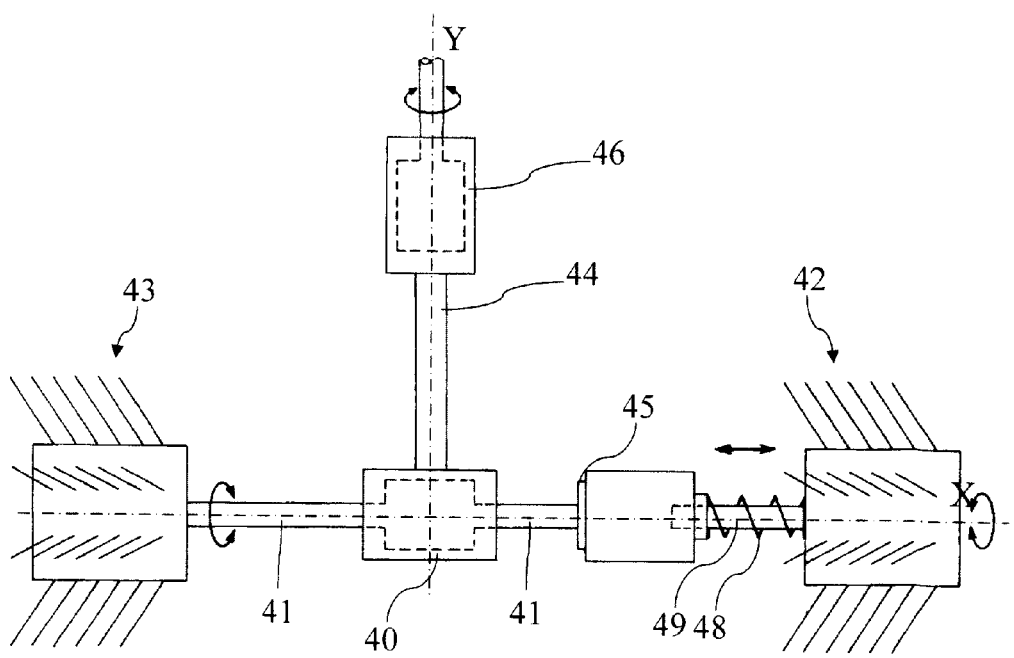
FIG. 3 schematically shows a third alternative embodiment of the traction module.

According to a third alternative embodiment shown in FIG. 3, a rod 44 is enbloc with the traction module and its rotation according to the axis Y is actuated by an actuator 46 connected to a first end of the rod, another electric motor 40 being connected to the other end of the rod 44 so that the respective rotor 41 is along X. An end of the rotor 41 of the motor 40 is connected to a first runner 43, defining its axis of rotation, and a second end of the rotor 41 is connected to another runner 42, defining its axis of rotation. In particular, the second end of the rotor 41 is connected to the runner 42 by means of a linear actuator 45 along X to which the axis 49 of the runner 42 is axially associated along X. A counter spring 48 possibly cooperates with the actuator 45.

As shown in the FIGS. 1 and 2, an opposed rotation of the runners 11, 12 and 21, 22 around the axis X determines a free rotation of the module 1 around the axis Y superimposed to the fulcrum 13, 23.

In FIG. 3, in relation to the aforementioned third alternative embodiment, the rotation of the module around the axis 44 is generated by the motor 46.

A first mode of forward movement of module 1 provides a concordant rotation of the runners. In such case, a forward movement of module 1 is, according to a direction Z, perpendicular to the axis X and Y.

Advantageously, module 1 is able to move forward by a concordant rolling of the runners according to a direction Z perpendicular to the axis X and Y when the ground conditions are favourable. When, on the contrary, the conditions of the ground are not favourable, the module 1 allows a forward movement according to the axis X by means of the alternate approaching and departing of the runners. Such forward movement is possible by providing the runners with a perimetral surface whose friction coefficient is not homogeneous in one way of the direction identified by the axis X. This lack of homogeneity may be obtained by realizing, for example, cone-shaped runners, whose vertex are concordantly oriented according to the axis X. Or, cylindrical runners may comprise a plurality of nails 50 whose one end is connected to the perimetral surfaces of the runners. The nails have the same orientation between each other, and in particular a nail is formed by an elongated element attached to the runner and having, at least temporarily, a projection towards said first direction X, preferably avoiding projections towards a direction parallel to Y.

As an alternative to the so-called nails, namely elongated and semi-rigid elements, the runners may be realized according to alternative modes, for example as described in the documents of the prior art mentioned above, in order to obtain the same technical effect.

It is worth noting that a possible absence of said lack of homogeneity of the friction coefficient in the perimetral surface of the runners along the axis X may although determine some advantages, since, when the runners are in a reciprocal distal position, the vehicle comprising a traction module 1 is more stable, while, when the runners are in a more proximal position, the vehicle occupies a smaller space, in terms of track.

Figure 4:
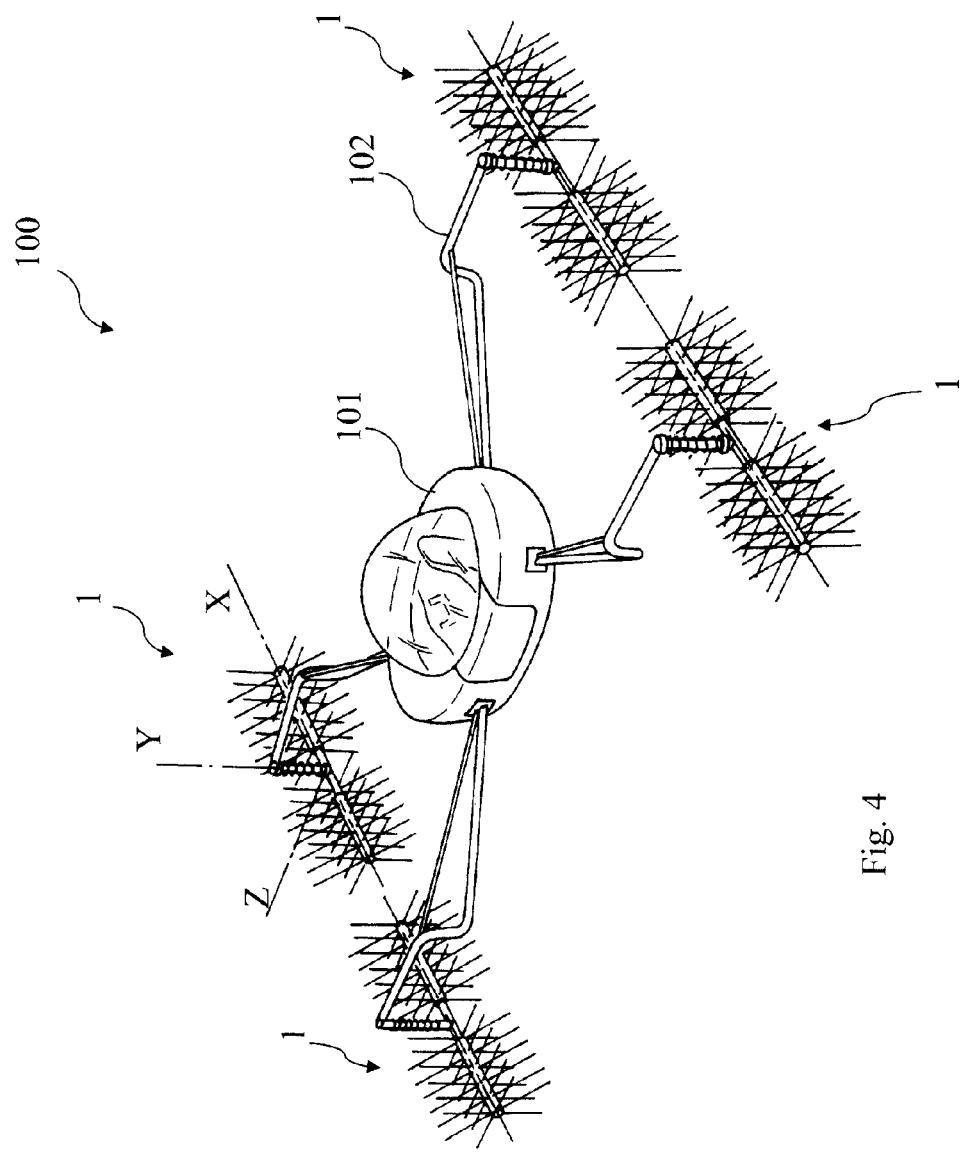
FIG. 4 schematically shows a terrestrial vehicle based on the traction module of FIG. 1, 2 or 3, which moves forward according to a first operating mode of the traction module.
Figure 5:
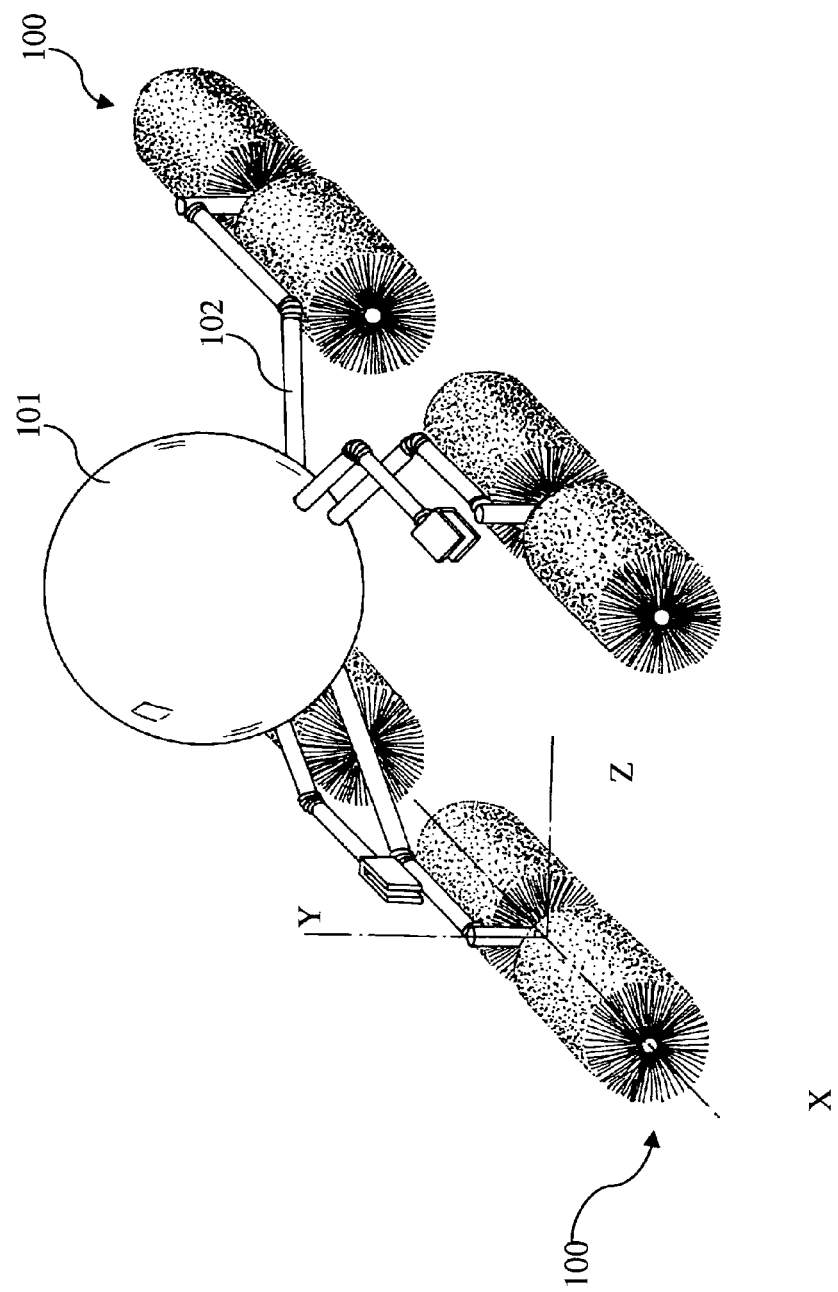
FIG. 5 shows a terrestrial vehicle based on the traction module of FIG. 1, 2 or 3, which moves forward according to a second operating mode of the traction module.

The present invention, with particular reference to FIGS. 4 and 5 describes examples of application of a traction module 1.

In particular, the vehicle 100 in the example comprises four traction modules 1. The four traction modules 1 are connected to the body 101 of the vehicle by means of support elements 102 arranged in pairs in order to identify two pseudo-axles.

The vehicle reflects the advantages described for the traction module 1.

When the ground conditions are favourable, the axis Z are concordant with the longitudinal development of the vehicle and the runners concordantly rotate, defining a first mode of forward movement of the vehicle. In such circumstance, the traction modules on the two sides of the vehicle are preferably oriented in an opposite way, namely with an opposed orientation of the nails. Otherwise the vehicle would laterally deviate towards the way with a lower friction coefficient. Such deviation, as it will be described below, is advantageous in case of a slope, for example when the vehicle runs along a promontory. In such case the friction force developed according to the axis X counterbalances a possible lateral sliding of the vehicle along the slope.

When required by the ground characteristics, the traction modules arrange themselves so that the respective axis X are aligned with the longitudinal development direction of the vehicle and move forward by means of the synchronous approaching and departing of the runners, defining a second mode of forward movement of the vehicle.

According to another aspect of the invention, when the axis X of the traction module is transversal with respect to the longitudinal direction of the vehicle, see FIG. 4, the traction modules may be activated according to the second mode of forward movement of the vehicle in order to move it laterally.

In such case, only the traction modules of one side of the vehicle may be activated, in order to allow a forward movement of the vehicle along the required lateral direction, or all the traction modules may be oriented in order to have all the nails 50 oriented in the same way. In such case, all the traction modules may cooperate the vehicle movement.

The rotation of the traction modules with respect to the axis Y corresponding to their fulcrum may be obtained by a rotation at the rod 13, 23 or by an opposed rotation of the electric motors associated to the runners. Such possibilities may be realized also in the alternative embodiments described above.

Moreover, more complex transmission systems may also be present in order to determine the torque distribution between the runners and the rod in a selective way, by means of solution that can be realized by the person skilled in the art.

Means for blocking the rotation of the rod around the axis Y may also be present, in order to simplify the control of the pairs of motors associated to each traction module. It is worth noting that the two modes of forward movement described above may be activated at the same time, for example in order to increase the friction with the ground during a forward movement concordant with the axis 2 parallel with each other. In such case, the traction modules 1 are opposed on the two sides in terms of orientation of the respective axis X, defining a third mode of forward moving of the vehicle. In such case, the vehicle does not deviate laterally, but it develops a higher friction with the ground.

According to a fourth mode of forward movement of the vehicle, the traction modules 1 are activated according to both modes of forward movement, namely by rolling and by approaching departing, with the traction modules 1 being concordantly oriented between each other in terms of friction coefficient with the ground.

This implies an oblique forward movement of the vehicle, that is particularly useful when running along a promontory. In such case it is possible to run along the promontory by climbing it at the same time.

According to a further aspect of the invention, the inclination of the nails 50 may be varied.

For example, such variation of inclination may be obtained by attaching the nails to a first cylinder slidingly associated to a second cylinder, that is external with respect to the first one. In the second cylinder, holes are present and the nails pass through them. A reciprocal sliding of the cylinders determines a bending of the nails which, outside the second cylinder, are bended with respect to the reciprocal sliding of the two cylinders.

Such sliding may be along or around the respective and coinciding axis of rotation X.

Thanks to this aspect of the invention, a rotation of each traction module 1 around the axis Y with an angle higher than ±90° is not necessary.

A vehicle 100 according to the present invention may advantageously comprise at least two traction modules 1, but it may advantageously comprise a higher number of modules, depending on the dimensions of the vehicle and on the presence of a possible articulation of the vehicle itself.

When a vehicle comprises only two traction modules 1, they are arranged in pairs parallel to each other in order to ensure the stability of the vehicle, but the angle of rotation around at least one of the fulcrums should be limited, namely lower than ±90°, in order to avoid a tilting of the vehicle. A vehicle with such configuration may move forward by rolling, by means of the first mode of forward movement, and laterally move by means of the second mode of forward movement.

The modes for controlling the functioning of the traction modules may be combined with the modes for controlling the forward movement of vehicles on wheels or on tracks.

The elements and the characteristics described in the different preferred embodiments may be combined without departing from the scope of the present invention.

The invention claimed is:

1. A vehicle traction module comprising
    a pair of runners disposed side by side according to a first axis,
    a linear actuator suitable to generate reciprocal movement of the runners relative to each other along said first axis, the linear actuator comprising counteracting springs,
    said pair of runners having a cylindrical symmetry shape wherein the respective axis of symmetry lies along said first axis,
    first rotating actuators suitable to generate a rotation of said runners around said first axis.

2. The module according to claim 1, further comprising a second rotating actuator, placed between the pair of runners suitable to enable rotation of the pair of runners along a second axis perpendicular with respect to said first axis.

3. The module according to claim 2, wherein
    said second rotating actuator comprises a rod extending along said second axis,
    said first rotating actuators comprise a first electric motor and a second electric motor integrated by the respective stators in the runners having respective rotors opposed along said first axis and associated to said rod,
    at least one of said rotors being associated to said rod by said linear actuator.

4. The module according to claim 1, wherein
    said second rotating actuator comprises a rod extending along said second axis,
    said first rotating actuators comprise two electric motors comprising stators connected to said rotating rod and respective rotors opposed between each other along said first axis and each one of them associated to said runners,
    at least one of said stators being associated to said rod by said linear actuator.

5. The module according to claim 2, wherein
    said second rotating actuator comprises a rod extending along said second axis and coupled to a second actuator electric motor suitable to generate rotation of the rod around said second axis,
    said first rotating actuators comprising a first actuator electric motor associated by a respective stator to the rod and comprising a rotor placed according to said first axis having a first end associated to a first one of the pair of runners and a second end associated to a second one of the pair of runners,
    said second end being associated to said other runner by said linear actuator.

6. The module according to claim 1, wherein lateral surfaces of the pair of runners have a non-homogeneous friction coefficient in one direction along way of said first axis.

7. The module according to claim 6, wherein each of the pair of runners are of a cylindrical shape and comprises projecting superficial elements.

8. The module according to claim 7, wherein at least one of said projecting superficial elements is formed by an elongated element attached to the respective one of the pair of runners.

9. The module according to claim 8, wherein each of the pair of runners comprises a first cylinder and a second cylinder, the first cylinder being inside the second cylinder and slidingly associated to the second cylinder; each elongated element being attached by one end to said first cylinder, and slidingly passing through a respective hole in a lateral surface of the second cylinder, so that a mutual sliding of the cylinders determines a variation of the inclination of the elongated element with respect to the lateral surface of the second cylinder.

10. A terrestrial vehicle comprising at least two traction modules according to claim 1, both traction modules being rotatably associated to the vehicle respective second directions; at least one of the traction modules being limited to a rotation with an angle ±90° with respect to forward movement of the vehicle.

11. A method for controlling a traction of a terrestrial vehicle according to claim 10 comprising the following steps:
    activation of a first one of the at least two traction modules and/or
    activation of a second one of the at least two traction modules.

12. The method according to claim 11, wherein, when the non-homogeneous friction coefficient of the pair of runners is adjustable, the method comprises the step of adjusting the non-homogeneous friction coefficient.

13. The method according to claim 12, comprising the step of controlling activation of the second one of the at least two traction modules and said non-homogenous friction coefficient in relation to a slope transversal to the longitudinal movement of the vehicle.

14. A terrestrial vehicle according to claim 1, comprising four traction modules arranged in pairs on a front axle and on a rear axle.

15. A method for controlling a traction of the terrestrial vehicle according to claim 14 comprising the following steps:
    activation of a first one of the at least two traction modules and/or
    activation of a second one of the at least two traction modules.

16. The method according to claim 15, wherein, when the non-homogeneous friction coefficient of the runners is adjustable, the method comprises the step of adjusting the non-homogeneous friction coefficient.

17. The method according to claim 16, comprising a step of controlling activation of said second one of the at least two traction modules and said non-homogenous friction coefficient in relation to a slope transversal to the longitudinal movement of the vehicle.

* * * * *